United States Patent Office 3,427,640
Patented Feb. 11, 1969

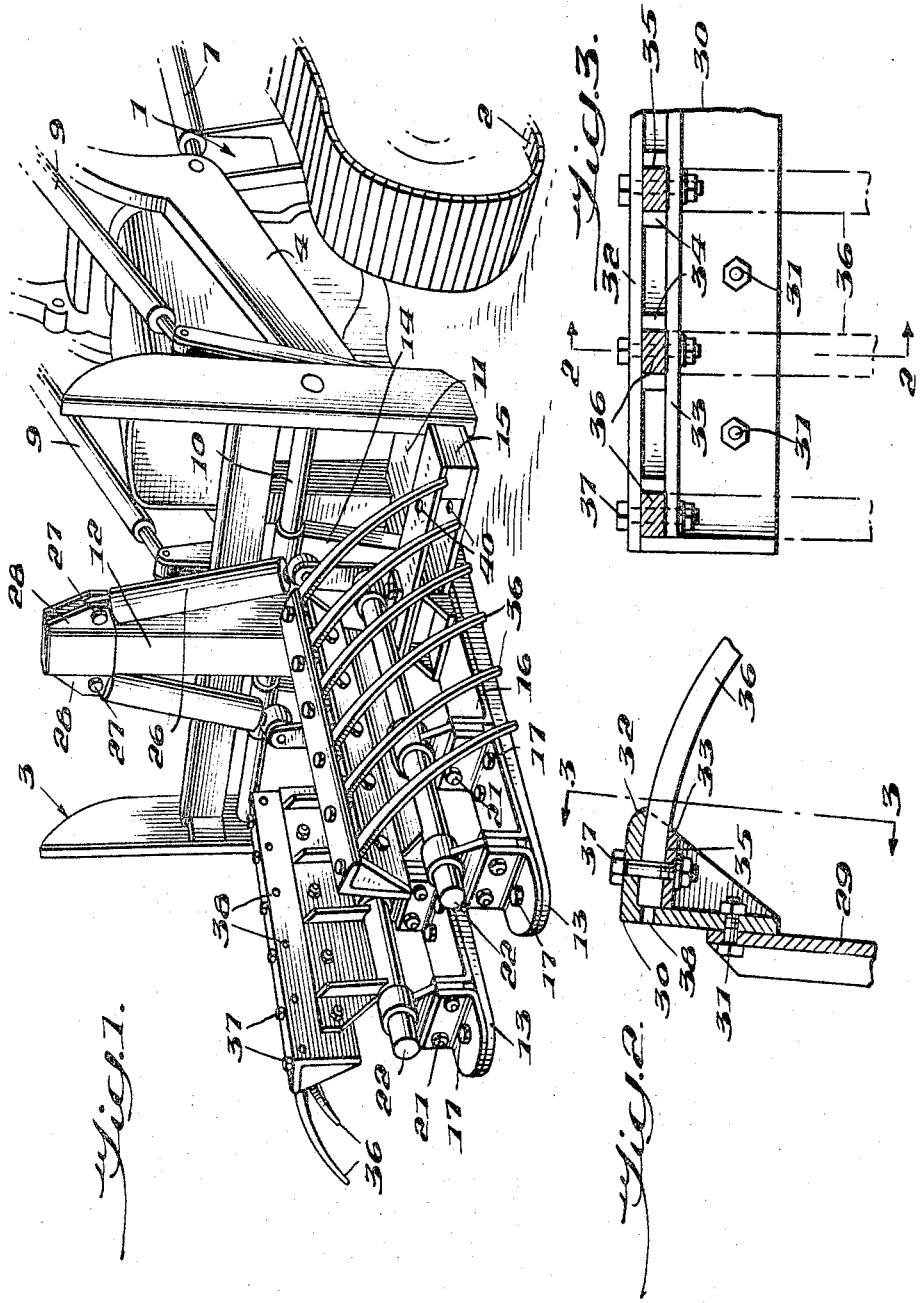

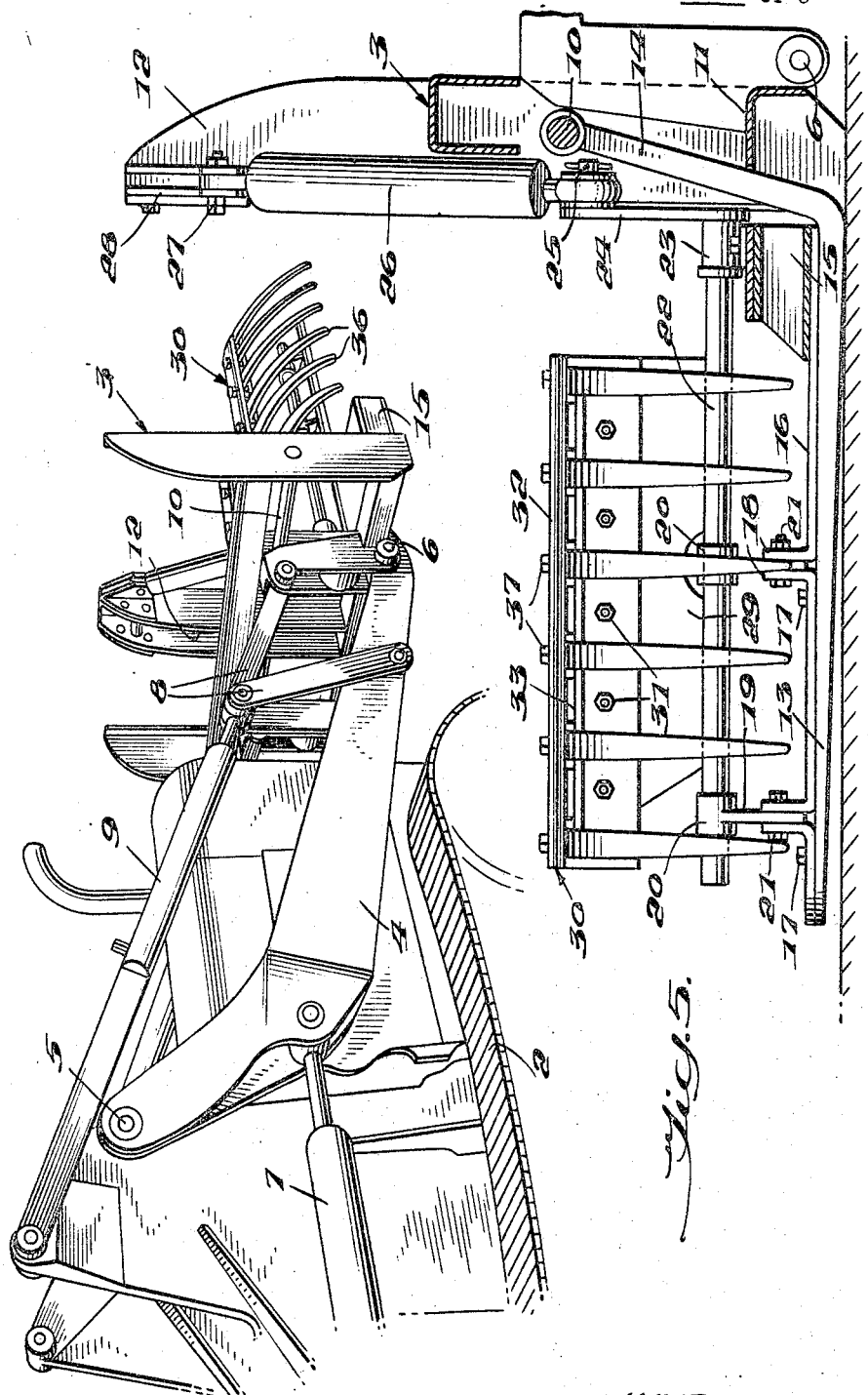

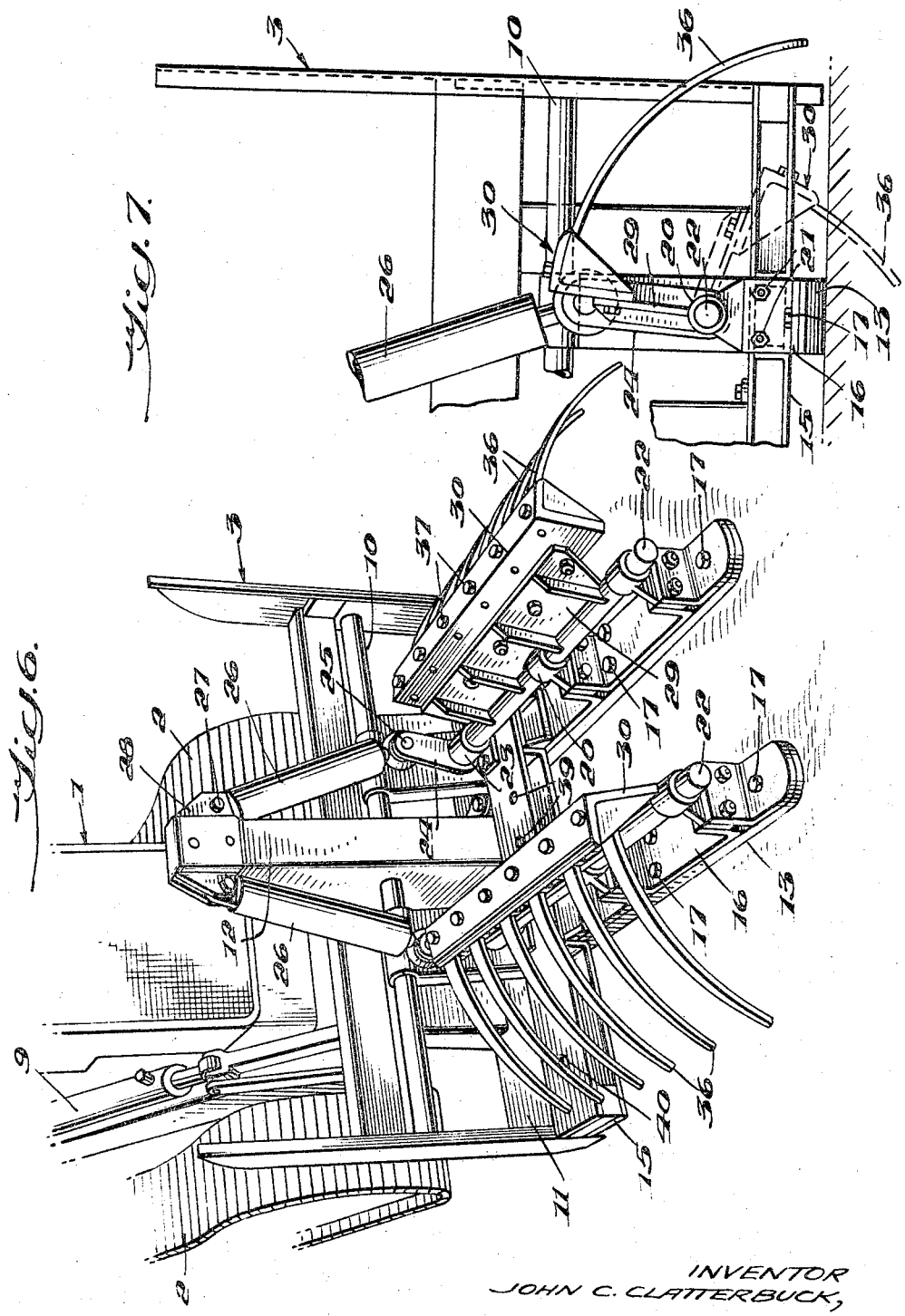

3,427,640
SCOOPING DEVICES
John C. Clatterbuck, R.F.D. 1,
Purcellville, Va. 22132
Filed Apr. 4, 1966, Ser. No. 539,769
U.S. Cl. 37—2                                    7 Claims
Int. Cl. A01g 23/06; A01b 13/06; B66c 3/04

ABSTRACT OF THE DISCLOSURE

A scooping device adapted to be mounted in the front of the tractor vehicle having a power lift assembly including fork members projecting outwardly therefrom, said device comprising shafts operatively mounted on the fork members and mounting digging tines that swing outwardly and below the fork members when the latter are lowered substantially to the ground to excavate the space between the fork members.

---

This invention relates to improvements in scooping devices of the character useful for removing trees, bushes and other plants, as well as for scooping up dirt, debris and various materials.

Various attempts have been made heretofore to provide devices useful for removing trees, brush and other plants, but usually these have required the gripping of the plant or tree and pulling it bodily from the ground, which not only breaks and destroys the root system of the plant, but also separates the dirt therefrom. Where it is desired to replant a tree or bush, it is undesirable either to remove the dire or to break the root system, but no satisfactory and effective device useful for this purpose has been provided heretofore.

One object of this invention is to provide a scooping device which is useful not only for lifting to remove and transplant trees, bushes and the like, but which is also capable of being used for scooping up various materials, such as dirt, debris, etc.

Another object of the invention is to simplify and improve power operated scooping devices so as to make such devices capable of multiple use, strong and sturdy, and capable of being mounted on a tractor vehicle.

Still another object of the invention is to provide a scooping device as an attachment for a tractor which can be applied to or removed from a tractor in a simple and easily handled manner, but when applied will be effective for the desired purpose.

These objects may be accomplished, according to one embodiment of the invention, by mounting digging and scooping sections on the forks of a front end loading attachment for rotary movement relative thereto in digging into the earth or other material, either to lift and remove it or to remove a plant or tree without disturbing the earth. The digging and scooping sections are pivotally supported on shafts that extend lengthwise of the forks and are power operated, as for example, by hydraulic cylinders. The forks can be raised and lowered by usual or desired power mechanism when applied as a front end loader on a tractor.

This embodiment is illustrated in the accompanying drawings, in which:

FIG. 1 is a front elevation of a tractor, showing the scooping device applied thereto;

FIG. 2 is a detail cross-section through the rotary head, taken on the line 2—2 in FIG. 3;

FIG. 3 is a partial side elevation thereof, with parts in section and taken on the line 3—3 in FIG. 2;

FIG. 4 is a perspective view of a portion of the tractor, showing the scooping device thereon;

FIG. 5 is a longitudinal sectional view therethrough;

FIG. 6 is a perspective view of the scooping device on the tractor and shown in a lowered position; and FIG. 7 is a partial end elevation thereof.

The invention is illustrated, particularly in FIGS. 1, 4 and 6, as applied to a conventional tractor, generally indicated by the numeral 1 and which is shown as having crawler supports 2 mounting the tractor for transportation. The tractor 1 is self-propelled and operated in any usual or desired manner and does not require detailed disclosure.

Supported on the front end portion of the tractor 1 is a front loader lift assembly, generally indicated at 3, comprising a rectangular frame adapted to support lift or loading structure. The lift assembly 3 is carried by a pair of boom arms 4 pivotally mounted at 5 on the tractor 1 and being pivoted at 6 to the lift assembly 3. The boom arms 4 are raised and lowered by hydraulic hoists 7 mounted on opposite sides of the tractor.

The lift assembly 3 is also connected with linkage 8 at each side of the tractor, which linkage 8 is operated by hydraulic cylinders 9 to tilt the lift assembly either forward or backward with respect to an upright transverse plane. Thus, the cylinders 7 provide for the bodily raising and lowering of the lift assembly 3, while the cylinders 9 serve either to maintain the lift assembly in a vertical position or to tilt it forward or backward, as desired. The hydraulic controls for the cylinders are not illustrated in detail, but these are well known in the art.

One form of lift assembly known in the art includes a transversely extending support shaft 10 which extends from side-to-side of the lift assembly and is mounted at opposite ends in opposite sides of the frame. A frame cross member 11 forms the base portion of the rectangular frame of the lift assembly 3. An upright post 12 is mounted on the base member 11.

Forks are shown at 13, spaced apart on opposite sides of the upright longitudinal center of the tractor. Each of the forks 13 projects forwardly a suitable distance in front of the lift assembly 3. The rear end portion of each of the forks 13 in this embodiment is turned upward to form an arm portion 14 journaled at its upper end on the transverse shaft 10. The forks 13 are capable of lateral shifting movement toward and from each other so as to provide the desired spacing. This shifting movement is accomplished by sliding the arm portions 14 lengthwise of the shaft 10.

Extending transversely in front of the frame member 11 at the bottom of the lift assembly 3 is a beam 15. This beam, in the form illustrated in the drawings as an example of this invention, is shown as formed of spaced top and bottom plates so as to provide a sturdy and rigid support section. At its opposite ends, the beam 15 is anchored securely to the upright members of the lift assembly 3, and intermediate its ends it extends over and may be seated upon the back end portion of the lifting forks 13 near the angle of said lifting forks with the arm portions 14 thereof.

Also seated upon the forks 13 is a base support 16. The base support 16 is detachably mounted on each fork 13 as by bolts or fastenings 17 so as to permit the attachment to be separated and removed therefrom, when desired, merely upon withdrawing the bolts or other fastenings.

The base support 16 for each fork 13 is shown as including a plurality of sections spaced apart and having upturned parallel ears 18 receiving between the ears of each pair a plate support 19 of a bearing 20. The plate support 19 is secured rigidly in place by bolts or other fastenings 21 extending through the ears 18 and the plate 19 therebetween.

Journaled in the bearings 20 is a shaft 22 which extends lengthwise over each fork 13 and spaced thereabove substantially throughout the length of the fork and backward at is rear end overlapping the cross beam 15 where the shaft 22 is journaled in a bearing 23 and projects through the latter bearing. The bearing 23 is mounted on the beam 15 in rigid relation thereto.

The rear end of the shaft 22 has fixed thereon one end of a crank 24, the opposite end of which crank 24 carried a crank pin 25 with which one end of a hydraulic cylinder 26 is connected so as to swing the crank 24 in one direction or the other whenever the cylinder 26 is expanded or contracted by hydraulic fluid pressure. The upper end portion of the hydraulic cylinder 26 is connected at 27 with a bracket 28 mounted on the upper end portion of the center post 12.

Each shaft 22 supports a swinging head 30 for turning movement around the axis of the shaft. A mounting plate 29 is fixed rigidly to the shaft 22 and may be suitably braced as required for rigidity and sturdiness. The mounting plate 29 may be in one or more sections, as desired, extending along the length of the shaft 22 and secured in any suitable manner thereto as by welding, bolting, etc.

The swinging head is shown at 30, which also extends lengthwise of the shaft 22 and is supported by the mounting plate 29 being detachably secured thereto by bolts 31 or other suitable fastenings. This swinging head 30 is capable of detachment and removal, when required, or for replacement in the event of breakage or damage thereto. The swinging head 30 may be formed of an angle bar or other suitable material having a flange 32 extending along the outer edge of the head. The free edge of the flange 32 may be sharpened to provide a spading effect when forced into the soil or other material. An inner plate 33 is spaced from the flange 32 and held in separated relation by welding or other suitable means securing these parts together.

Spacers are shown at 34 in FIG. 3, intermediate the flanges 32 and 33, cooperating therewith to form sockets 35 adapted to receive the inner ends of tines 36. The tines 36 are detachable and replaceable in their respective sockets 35, being held in place by bolts 37. Orifices 38 are formed through the swinging head 30 to aid in driving out of the socket a broken end of a tine 36 after removal of the bolt 37 therefrom in the event of need for replacement.

A swinging head assembly is provided on each side of the upright longitudinal center of the tractor or support vehicle and mounted on the respective forks 13. The swinging head assembly, which includes the tines 36, is capable of swinging movement around the axis of the corresponding shaft 22 from the raised position illustrated in FIGS. 1 and 6 and in full lines in FIG. 7, to the digging or scooping position illustrated in dotted lines in FIG. 7. In the latter position, the tines approach substantially into meeting or somewhat overlapped relation to effect a digging or scooping action in the earth or in material to be lifted. This swinging motion of the head assembly is accomplished by manipulation of the hydraulic cylinders 26 acting through the crank arms 24 to rotate the respective shafts 22 on which the swinging heads are mounted.

The degree of penetration of the tines 36 into the soil or other material to be scooped up will depend upon the length and curvature of the tines and the spacing of the assemblies apart. Being mounted on the forks 13, the latter are capable of sliding movement along the support shaft 10 and thereby to vary the distance of the swinging heads from each other.

In using the device for lifting or transplanting a tree, for example, it is preferred that the lift assembly 3 be lowered to dispose the forks 13 directly upon the ground, which adds stability and bracing effect in accomplishing the scooping action. The lift assembly 3 is thus lowered by operation of the boom arms 4 upon manipulation of the hydraulic cylinders 7.

With the forks 13 thus resting on the ground in straddling relation to the tree, as illustrated in FIGS. 1 and 6, the cylinders 26 are then operated to move the swinging heads 30 about the axes of the shafts 22. This causes the tines 36 to be forced lengthwise into the soil, moving around the axes of the respective shafts 22 until they reach positions substantially in abutting or overlapped relation according to the spacing of the forks. This would cause the tines to enter the earth around and beneath the roots of the tree, so that upon upward swinging movement of the boom arms 4 by manipulation of the hydraulic cylinders 7, the tree and the dirt about the roots thereof will be lifted bodily by the tines 36.

The vehicle may then be manipulated to move the tree to a new location or to set it upon a truck or other transport vehicle or to set it down on the ground for balling or handling.

The device may be operated in a similar manner for many other uses, such as the lifting or transplanting of bushes or other plants or for scooping up or forking up material of many different types. This is accomplished in a simple and expeditious manner and by a very sturdy structure capable of handling heavy loads when needed.

The parts may be applied to or detached from the conventional parts of a tractor in a simple manner by few fastenings. Detachable fastenings are used to secure the attachment to the parts of the tractor not only to enable other uses of the conventional tractor, but also for ready replacement of any parts as needed.

When the swinging head assembly is removed from the forks 13, the tree lifting device, which is the subject matter of my patent, No. 3,140,786, granted July 14, 1964, may be substituted for the scooping attachment by connection with the beam 15 and with the forks 13 in the manner described in the aforesaid patent. The jaws of said device may be secured to the beam 15, by bolts extending through holes 39 in the beam. The jaws are operated by hydraulic cylinders (described in said patent) mounted on the outer ends of the beam 15 by bolts engaging in holes 40 therein.

While the invention has been illustrated and described in one embodiment, it is recognized that variations and changes may be made therein without departing from the invention as set forth in the claims.

I claim:

1. A scooping device, the combination with a tractor having a lift assembly mounted on an end portion thereof for raising and lowering movements, a cross beam extending from side-to-side of the lift assembly, and lifting forks secured to the cross beam and extending outwardly therefrom, of shafts extending forwardly from the tractor in substantially parallel relation over the lifting forks and journaled on the lifting forks, power means operatively connected with the shafts for turning the latter, and rotary heads mounted on the shafts having digging means connected therewith and extending in opposite directions laterally outward of upright planes through the axes of the shafts in positions for scooping action underneath the lifting forks in lowered position on the ground upon rotary movement of the shafts and heads to move into opposed cooperating relation for digging material beneath the surface on which the tractor is operated.

2. A scooping device according to claim 1, wherein the lift assembly includes a transversely extending beam having the shafts journaled at one end on the beam and extending outwardly therefrom in cantilever fashion.

3. A scooping device according to claim 1, wherein the lift assembly includes a transversely extending beam and an upright post intermediate the length of the beam, means mounting the shafts at one end on the beam on opposite sides of the post, crank arms fixed to the shafts at said one end and extending upwardly therefrom, and hydraulic power devices operatively connected at one end with the crank arms and operatively connected at the opposite end to the post.

4. A scooping device according to claim 1, wherein the rotary heads have sockets in the respective lateral sides thereof and open in one direction from the respective heads and the opposite end of the socket being closed, tines having one end of each inserted endwise in one of said sockets toward said closed end, detachable fastenings for securing the tines in the sockets, the rotary head having an orifice in the closed end of the socket in axial alignment with the end of the tine for insertion of means to drive the tine of the socket upon removal of the detachable fastening.

5. A scooping device according to claim 1, wherein the lifting forks have bottom ground engaging faces, and means located above the ground engaging faces of the lifting forks for operating the digging means to positions beneath said ground engaging faces.

6. A scooping device comprising base structures spaced apart laterally from each other, shafts extending over the base structures in substantially parallel relation, ears mounted on the base structures and having bearings journaling the shafts for turning movement, mounting plates fixed to the respective shafts and extending lengthwise thereof, rotary heads carried by the mounting plates, each of the rotary heads having a plurality of outwardly opening sockets therein, and tines having one end inserted into the sockets and extending outwardly in opposite directions from the respective heads for digging action upon swinging movement of the rotary heads.

7. A scooping device according to claim 6, including detachable fastenings for securing the tines in the sockets, each of the sockets having a closed end opposed to an end of the tine, said closed end having an orifice at the end thereof in opposed relation to the tine for insertion of means in the orifice to drive the tine out of the socket upon removal of the detachable fastening.

References Cited

UNITED STATES PATENTS

| | | | |
|---|---|---|---|
| 1,511,292 | 10/1924 | McLeod | 37—2 |
| 2,482,950 | 9/1949 | Toftey | 37—2 |
| 2,611,498 | 9/1952 | Broersma. | |
| 2,620,935 | 12/1952 | Christiansen. | |
| 3,021,971 | 2/1962 | Rensch | 37—2 |
| 3,110,477 | 11/1963 | Campbell. | |
| 3,193,951 | 7/1965 | Beeson | 37—2 |
| 3,319,813 | 5/1967 | Beyea | 214—147 |

FOREIGN PATENTS

| | | |
|---|---|---|
| 1,329,452 | 7/1962 | France. |

ROBERT E. PULFREY, *Primary Examiner.*

EUGENE H. EICKHOLT, *Assistant Examiner.*

U.S. Cl. X.R.

214—147; 294—106